Dec. 2, 1958 W. P. FOX 2,862,270
CABLE CLAMP
Filed Sept. 13, 1957
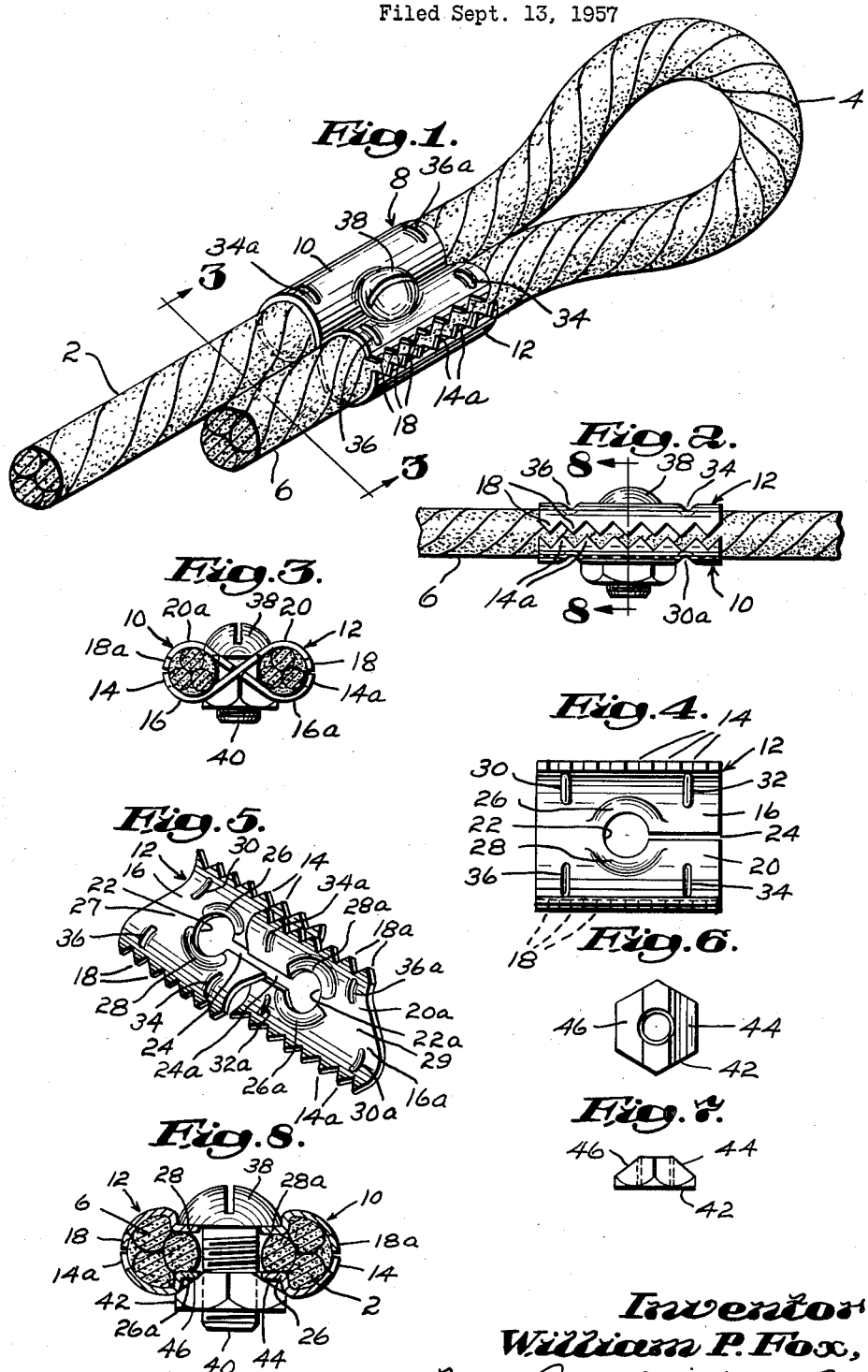
Inventor:
William P. Fox,
by Porter, Chittick & Russell
Attorneys United States Patent Office 2,862,270
Patented Dec. 2, 1958

2,862,270

CABLE CLAMP

William P. Fox, Newton Center, Mass., assignor to Merriman Bros., Inc., Boston, Mass., a corporation of Massachusetts Application September 13, 1957, Serial No. 683,873

9 Claims. (Cl. 24—125)

This invention is concerned with the provision of a new and novel cable clamp designed to secure in close parallel relationship portions of two cables or the two portions of a single cable which has been doubled back upon itself.

One of the objects of the present invention is to provide a cable clamp which within limits may be made in a variety of sizes capable of gripping cables running from very small diameters, such as ⅛ inch, up to much larger sizes in which the cables might be as big as 2 inches in diameter. The principle of operation is the same regardless of the cable size.

When reference is made in the specification and claims to a cable, it will be understood that this refers to all rope-like flexible elements which specifically may be called cables, ropes, lines, etc. In general, the type of cable to which the clamp will be applied is made of strands and may be of cotton, manila, Dacron, Orlon, nylon, steel or other materials. The clamp is designed to hold two portions of cable in close parallel relationship in such manner that the cables cannot shift longitudinally with respect to each other.

A further object of the invention is the provision of a clamp having a plurality of gripping mechanisms present in the several parts which gripping mechanisms include teeth along the longitudinal edges and transverse ribs both of which, when the two halves of the clamp are drawn tightly together, embed themselves in the surfaces of the cable portions. These cable engaging elements are sufficient to prevent movement of the cable with respect to the clamp.

Another object of the invention is the provision of a clamp comprising two identical elements which by means of a novel construction, including staggering of the teeth, may be reversed with respect to each other and interlocked to be held together by a bolt and nut or other equivalent means. By having the two parts of the clamp identical, a substantial saving in the cost of dies is effected, enabling the clamp to be produced very economically. Each half of the clamp includes therein depressed areas to receive the head of the bolt and the underside of a specially formed nut, whereby the nut will be held against rotation as the bolt head is rotated with a screwdriver. This enables the clamp to be set up or released readily through the use of a screwdriver only.

One of the principal uses of the present clamp is in providing means for readily preparing an eye in the end of a cable used for steering motor boats. In such use, adjustment of the length of the cable through adjustment of the eye is often needed. The clamp finds particular use in connection with steering cables used with outboard motors in which the cable may be a stainless steel rope of small diameter covered with a plastic sheath. The clamp is effective in such instances even though the surface of the cable is smooth because the teeth and transverse ribs of the clamp are capable of digging into the surface sufficiently. The clamp may be used with slightly smaller cables of such diameter that the teeth will not make engagement therewith, but nevertheless the cable will be held by the frictional engagement with the opposed areas of the clamp. The staggered arrangement of the teeth permits the two halves to be closed until the teeth are completely intermeshed.

These and other objects of the invention will become more apparent as the description proceeds with the aid of the accompanying drawings in which—

Fig. 1 is a perspective view showing the clamp applied to the doubled-back end of a cable, thereby forming an eye in the cable.

Fig. 2 is a side elevation of Fig. 1.

Fig. 3 is a section taken on the line 3—3 of Fig. 1.

Fig. 4 is a plan view of one of the two identical clamp elements.

Fig. 5 shows the two clamp elements reversed with respect to each other and positioned to commence assembly movement.

Fig. 6 is a plan view of the underside of a nut specially designed for use with the clamp.

Fig. 7 is a front elevation of the nut shown in Fig. 6.

Fig. 8 is an enlarged section taken on the line 8—8 of Fig. 2 showing more clearly the manner in which the head of the bolt and the nut are received in the centrally deformed portions of the two clamping elements.

Referring now to Fig. 1, the clamp is shown in an arrangement illustrating a typical use to which it may be put. In this case, a cable 2 has been doubled back upon itself to form an eye 4 with the tail of the eye at 6. The clamp, generally referred to at 8, has been applied to the parallel portions 2 and 6 of the cable, clamping them in fixed relation, thereby to provide a permanent or adjustable eye which may be utilized as desired. The clamp 8, it will be understood, could be used equally well to connect two separate cables.

The clamp 8 comprises two identical elements interlocked in reverse position with respect to each other and which in the several figures are designated 10 and 12. One of these elements is shown in plan in Fig. 4 and will be described as a plan view of element 12. This element as shown has upwardly facing teeth 14 along the edge of the concave upwardly portion 16 and downwardly facing teeth 18 along the edge of the convex upwardly portion 20. In end view, element 12 is generally S-shaped, as can be seen by reference to Fig. 3.

In the center of element 12 is a hole 22 from which extends a longitudinal axial slot 24, which slot is wide enough to receive therein the body of another identical element. On one side of the hole 22 is an area 26 which has been deformed upwardly with respect to concave portion 16, and on the other side of the hole 22 is another area 28 which has been deformed downwardly with respect to the convex portion 20. These deformed areas are of such dimensions that there may be received thereon the bolt head and nut when the two identical clamping elements 10 and 12 have been interlocked.

On referring to Fig. 5, in which is shown the two elements 10 and 12 about to be slid together to operative position, it will be seen that element 10, which is identical with element 12 but in reversed position, has a plurality of downwardly extending teeth 18a designed to cooperate with teeth 14 of element 12 and upwardly extending teeth 14a designed to cooperate with teeth 18 of element 12. The deformed areas in element 10, Fig. 5, are area 26a, which is deformed upwardly from the concave portion 16a, and the area 28a, which is deformed downwardly from the convex portion 20a. The hole 22a which these areas surround has extending therefrom a slot 24a capable of straddling the integral portion 27 of element 12, while the slot 24 straddles the integral portion 29 of element 10 when the two identical parts are set in reverse position and slid longitudinally together.

Attention is now directed to the arrangement of the teeth, which arrangement makes it possible for the two elements to be formed from identical dies and still capable of cooperating in the manner indicated.

On referring to Fig. 2, it will be noted that element 12 has seven complete teeth numbered 18, whereas element 10 has six complete teeth 14a with a half-tooth at each end. In other words, the opposed teeth 18 and 14a of the two elements are staggered one-half tooth longitudinally with respect to each other. The teeth 14 on the other side of element 12 are staggered one-half tooth with respect to teeth 18 and consist of six whole teeth and two half-teeth at the ends, the same as teeth 14a. Teeth 14 cooperate with the seven whole teeth 18a on the opposite edge of element 10 which are staggered one-half tooth with respect to teeth 14a. Thus, by staggering the teeth at one side of the element one-half tooth with respect to the teeth on the other side, it follows that when two identical elements are reversed and interlocked in the manner indicated, the teeth of the two elements will always be in proper meshing relation as shown in Fig. 2.

It can be seen from Figs. 2 and 3 that the clamp illustrated could be used to secure a cable somewhat smaller than cable 6 since the teeth 18 and 14a are capable of further approach because of their staggered relation. In such case, the teeth would not dig into the cable and the clamp holding power would reside in the clamping pressure applied.

Additional means are provided for insuring against slippage of the cable, and in a preferred form consist of transverse ribs 30 and 32 on the portion 16 of element 12 and ribs 34 and 36 on the convex portion 20 of element 12. The ribs project in the direction of the concave sides of the several portions to an extent sufficient to press into the cables placed therebetween.

To secure the two halves of the clamp together, a bolt and nut of suitable proportions may be used, one such being as illustrated in Figs. 6, 7 and 8 with the head 38 of bolt 40 residing in the deformed areas of the elements 10 and 12 on one side and the nut 42 residing in the deformed areas on the other side. In order to prevent rotation of the nut, it has been found desirable to bevel the nut to form two parallel surfaces indicated at 44 and 46 in Figs. 6 and 7, which surfaces engage the deformed areas in such manner that rotation of the nut is prevented. Thus to set the clamp up, it is merely necessary to use a screwdriver in the slot of head 38.

It is my intention to cover all changes and modifications of the example of the invention herein chosen for purposes of the disclosure which do not constitute departure from the spirit and scope of the invention.

I claim:

1. A cable clamp comprising two identical elements, each element being a plate formed to an S-shaped configuration about its longitudinal axis, a plurality of teeth along each of the straight longitudinal edges of said element, each element having a hole through the center thereof, each element having a slot extending from one end thereof to the said center hole, whereby said two elements when placed in reversed position with respect to each other may be interlocked with the slot of each element straddling the corresponding integral portion of the other element and the concave portions and teeth of the two elements will be in adjacent and opposed relation, and means for forcing said opposed portions and teeth of said elements toward each other thereby to produce a clamping action on cables placed within the oppositely disposed S-shaped portions.

2. A cable clamp as in claim 1, the said teeth on one edge of said element being staggered longitudinally a distance of one-half tooth with respect to the teeth on the other longitudinal edge, whereby the opposed teeth of the two elements will be positioned for meshing relationship when the center holes are in alignment.

3. A cable clamp as in claim 1, each of said elements including inwardly extending transverse ribs acting to aid in gripping cables placed between said elements.

4. A cable clamp as in claim 1, the said means for forcing said opposed portions toward each other comprising a bolt and cooperating nut, the areas of each element immediately adjacent the said hole on opposite sides of the longitudinal axis being deformed toward the concave side thereof, whereby when said elements are interlocked the head of the bolt and the cooperating nut may be received in said deformed areas.

5. A cable clamp as in claim 4, the said teeth on one edge of said element being staggered longitudinally a distance of one-half tooth with respect to the teeth on the other longitudinal edge, whereby the opposed teeth of the two elements will be positioned for meshing relationship when the center holes are in alignment.

6. A cable clamp as in claim 5, each of said elements including inwardly extending transverse ribs acting to aid in gripping cables placed between said elements.

7. A cable clamp comprising two identical elements, each element being a plate formed to an S-shaped configuration about its longitudinal axis, each element having a hole through the center thereof, each element having a slot extending from one end thereof to the said center hole, whereby said two elements when placed in reversed position with respect to each other may be interlocked with the slot of each element straddling the corresponding integral portion of the other element and the concave portions of the two elements will be in adjacent and opposed relation, and means for forcing said opposed portions of said elements toward each other thereby to produce a clamping action on cables placed within the oppositely disposed S-shaped portions.

8. A cable clamp as in claim 7, each of said elements including inwardly extending transverse ribs acting to aid in gripping cables placed between said elements.

9. A cable clamp as in claim 7, the said means for forcing said opposed portions toward each other comprising a bolt and cooperating nut, the areas of each element immediately adjacent the said hole on opposite sides of the longitudinal axis being deformed toward the concave side thereof whereby when said elements are interlocked the head of the bolt and the cooperating nut may be received in said deformed areas.

No references cited.